(12) United States Patent
Morgan (10) Patent No.: US 11,774,540 B2
(45) Date of Patent: Oct. 3, 2023

(54) SYSTEMS AND METHODS FOR ENHANCING LOCATION OF GAME IN THE FIELD

(71) Applicant: LouStat Technologies, LLC, Columbus, MS (US)

(72) Inventor: Joe Morgan, Columbus, MS (US)

(73) Assignee: Loustat Technologies, LLC, Columbus, MS (US)

( * ) Notice: Subject to any disclaimer, the term of this patent is extended or adjusted under 35 U.S.C. 154(b) by 159 days.

(21) Appl. No.: 17/226,836

(22) Filed: Apr. 9, 2021

(65) Prior Publication Data

US 2022/0326331 A1    Oct. 13, 2022

(51) Int. Cl.
| | |
|---|---|
| *G01S 3/808* | (2006.01) |
| *H04R 1/40* | (2006.01) |
| *H04R 3/00* | (2006.01) |
| *A01M 31/00* | (2006.01) |

(52) U.S. Cl.
CPC ......... *G01S 3/8083* (2013.01); *A01M 31/002* (2013.01); *H04R 1/406* (2013.01); *H04R 3/005* (2013.01)

(58) Field of Classification Search
CPC .... G01S 3/8083; A01M 31/002; H04R 1/406; H04R 3/005; H04R 2201/401; H04R 1/342
See application file for complete search history.

(56) References Cited

U.S. PATENT DOCUMENTS

| | | | | |
|---|---|---|---|---|
| 3,517,316 A * | 6/1970 | Hatcher | .................. | G01V 1/001 455/96 |
| 4,198,705 A * | 4/1980 | Massa | ................... | G01S 3/8036 342/437 |
| 4,910,718 A * | 3/1990 | Horn | ........................ | G01S 5/20 367/129 |
| 5,099,455 A * | 3/1992 | Parra | ...................... | G01V 1/001 367/127 |
| 5,168,471 A * | 12/1992 | Parra | ....................... | G01S 15/87 367/99 |
| 5,168,473 A * | 12/1992 | Parra | ....................... | G01S 15/96 367/118 |
| 5,168,474 A * | 12/1992 | Parra | ...................... | G10K 11/04 367/118 |
| 5,615,175 A * | 3/1997 | Carter | .................... | G01S 3/803 367/124 |
| 5,729,507 A * | 3/1998 | Massa | .................... | G01S 3/803 367/126 |
| 7,333,622 B2 * | 2/2008 | Algazi | ................... | H04S 7/304 381/26 |

(Continued)

OTHER PUBLICATIONS

Duckworth et al.; Fixed and wearable acoustic counter-sniper systems for law enforcement; 22 pages; Nov. 5, 1998. (Year: 1998).*

*Primary Examiner* — Daniel Pihulic
(74) *Attorney, Agent, or Firm* — Dennen IP Law, LLC (57) ABSTRACT

A sound detector system has one or more microphone positioned with a field of regard of 360°. The system further has a processor to translate a sound into data indicative of a direction and transmit the data indicative of direction. Additionally, the system has a handheld device configured to wirelessly receive the data indicative of the direction and display data identifying the field of direction to a user.

5 Claims, 8 Drawing Sheets

(56) References Cited

U.S. PATENT DOCUMENTS

| | | | | |
|---|---|---|---|---|
| 7,844,248 B2* | 11/2010 | Sotack | ............ | H04M 1/72421 |
| | | | | 455/550.1 |
| 8,478,319 B2* | 7/2013 | Azimi-Sadjadi | ....... | H04B 17/27 |
| | | | | 367/124 |
| 8,737,168 B2* | 5/2014 | Somasundaram | ... | H05K 7/1498 |
| | | | | 367/127 |
| 8,867,313 B1* | 10/2014 | Rivlin | ................... | G01S 11/14 |
| | | | | 367/118 |
| 2011/0069585 A1* | 3/2011 | Baxter | ..................... | G01S 5/22 |
| | | | | 367/128 |
| 2012/0170413 A1* | 7/2012 | Fisher | ..................... | G01S 5/18 |
| | | | | 367/127 |
| 2014/0003195 A1* | 1/2014 | Vonog | ....................... | G01S 5/18 |
| | | | | 367/129 |
| 2014/0204716 A1* | 7/2014 | Kleijn | ..................... | G01S 3/80 |
| | | | | 367/127 |
| 2016/0084937 A1* | 3/2016 | Lin | ........................ | G01S 5/28 |
| | | | | 367/125 |
| 2021/0329373 A1* | 10/2021 | Pawlak | ................ | H04R 3/005 |
| 2022/0326331 A1* | 10/2022 | Morgan | ............ | A01M 31/002 |

* cited by examiner

SYSTEMS AND METHODS FOR ENHANCING LOCATION OF GAME IN THE FIELD

BACKGROUND

A hunter uses different senses when hunting prey. The hunter may hunt prey, including but not limited to deer, turkey, etc. In hunting the prey, the hunter uses his sight to see broken branches that may indicate prey is close. Further, the hunter may use his sense of sight to see the prey before shooting. The hunter may use his sense of smell to detect waste matter and follow a trail. Also, the hunter may use his sense of hearing to locate prey.

Some hunters lack the sense of hearing necessary to hear prey. In such a scenario, it makes it extremely difficult to locate prey in a wooded area or any other area where prey may be found.

DETAILED DESCRIPTION OF DRAWINGS

DETAILED DESCRIPTION

The present disclosure relates to systems and methods for enhancing location of game in a field. In particular, the system for enhancing location of game in the field includes a detection device that has a 360° range of detecting sound. The detection device is placed in the field, and it listens for sound in the field.

The system for enhancing location of game in the field further comprises a handheld device used by the hunter. Thus, if sound is detected, the detection device communicates with the handheld device. The handheld device communicates to the hunter via a graphical user interface (GUI) the location of the sound, e.g., South, North, Southeast, Southwest, Northeast, Northwest, etc.

Figure 1:
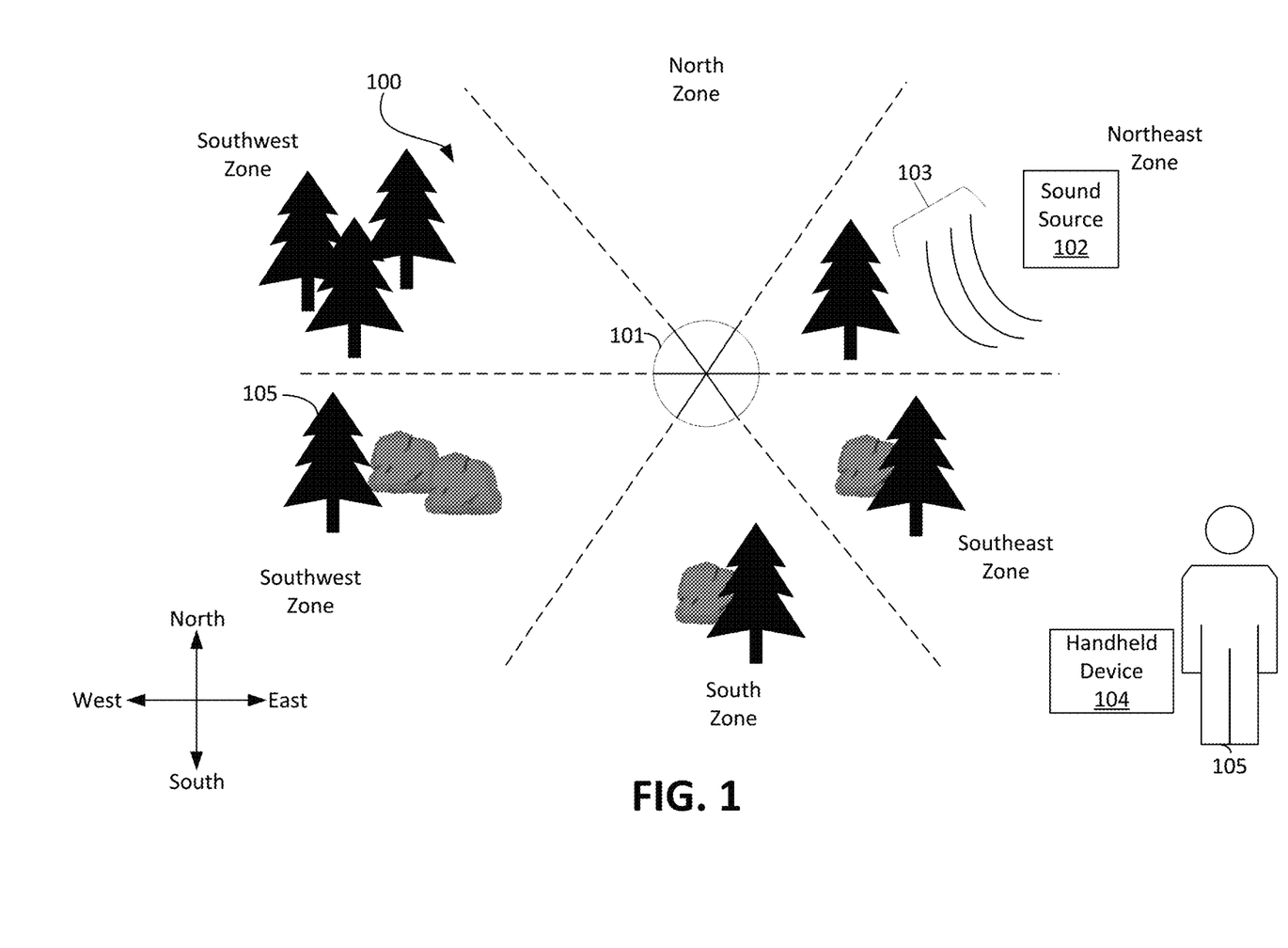
FIG. 1 is a block diagram of a system for enhancing location of game in the field in accordance with an embodiment of the present disclosure.

FIG. 1 is a depiction of the system 100 for enhancing location of game in a field. The system 100 for enhancing location of game in a field comprises a detector 101. The detector 101 comprises a plurality of microphones (not shown) that detect sound in a 360° field of view.

Further, the system 100 for enhancing location of game in the field comprises a handheld device 104. The handheld device 104 is used by a hunter 105.

In operation, a sound source 102 creates a sound. Note that a sound source 102 may be a type of animal, e.g., deer or turkey. The sound waves 103 travel through the foliage 106 or obstacle.

The sound waves 103 travel toward the detector 101. One of the plurality of microphones detects the sound waves 103.

In response, the detector 101 translates the sound waves 103 into a direction. In the example provided in FIG. 1, the soundwaves 103 are traveling from the Northeast zone. So, the detector 101 translates the sound waves 103 in data indicative of the Northeast.

Thus, the detector 101 transmits data indicative of the Northeast zone to the handheld device 104. Upon receipt, the handheld device 104 displays the direction to the hunter 105 via a GUI.

Upon receipt of the direction provided in the GUI, the hunter 105 moves his location to the Northeast zone. Upon moving, the hunter 105 will be in a better position to kill the prey.

Figure 2:
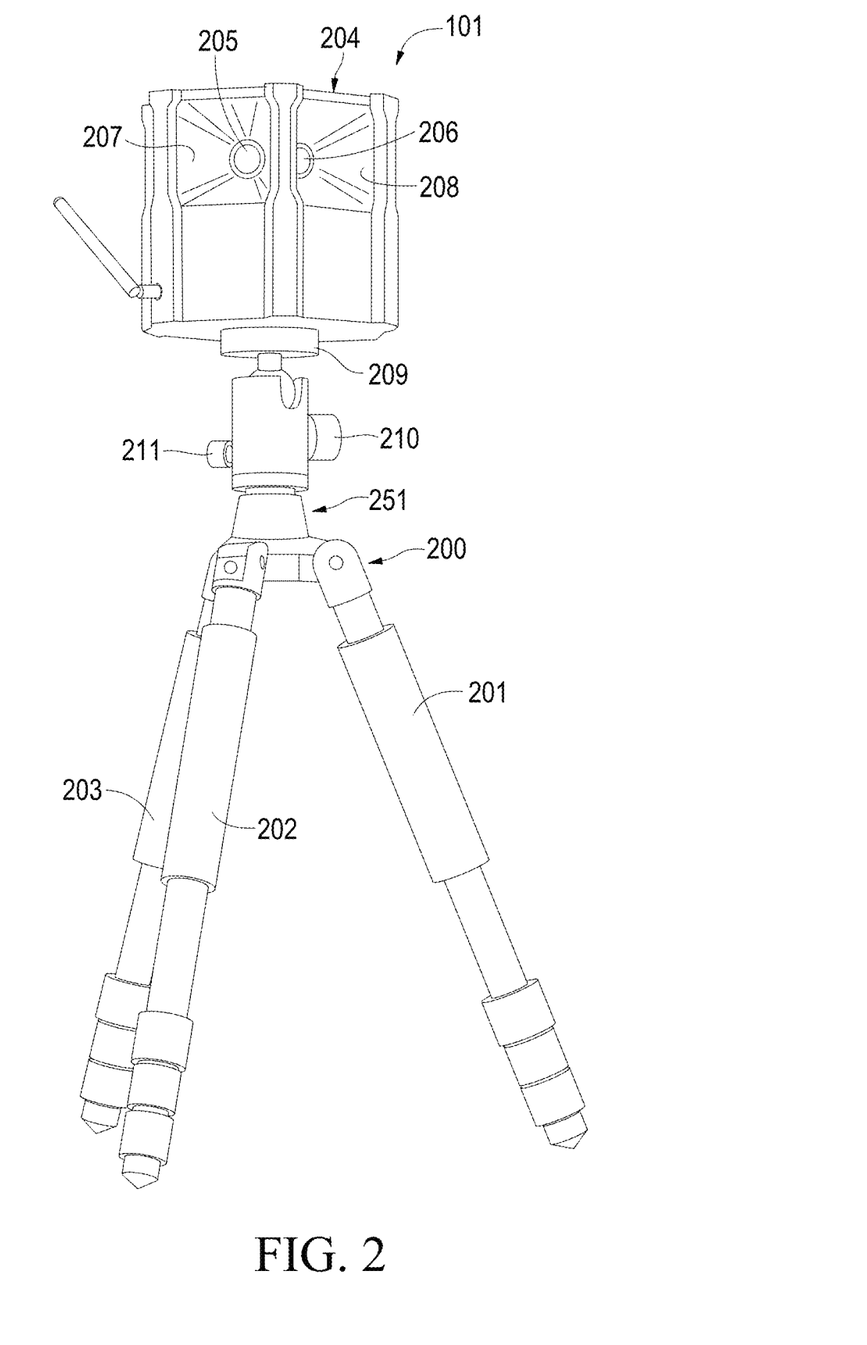
FIG. 2 is an exemplary detector such as is shown in FIG. 1.

FIG. 2 is an exemplary embodiment of a detector 101 according to an exemplary embodiment of the present disclosure.

The detector 101 comprises a base 100. The base is made up of three legs 202-203. In this regard, the base is a tripod. The legs 202-204 coupled to a body 211 of the detector 101. The body of the detector 101 comprises actuators 210 and 211 for positioning a head 204 of the detector.

The head 204 is fixedly coupled to a connector member 209. The head 204 comprises a plurality of microphone cones 207 and 208. The cones 207 and 208 aid the microphone in picking up sound waves 103 (FIG. 1).

At the vertex of each cone is coupled a microphone (not shown). The microphones 205 and 206 detect sound waves 103 from its direction. For example, if the microphone is facing Northeast, the microphone will pick up sound waves 103 from the Northeast.

Figure 3:
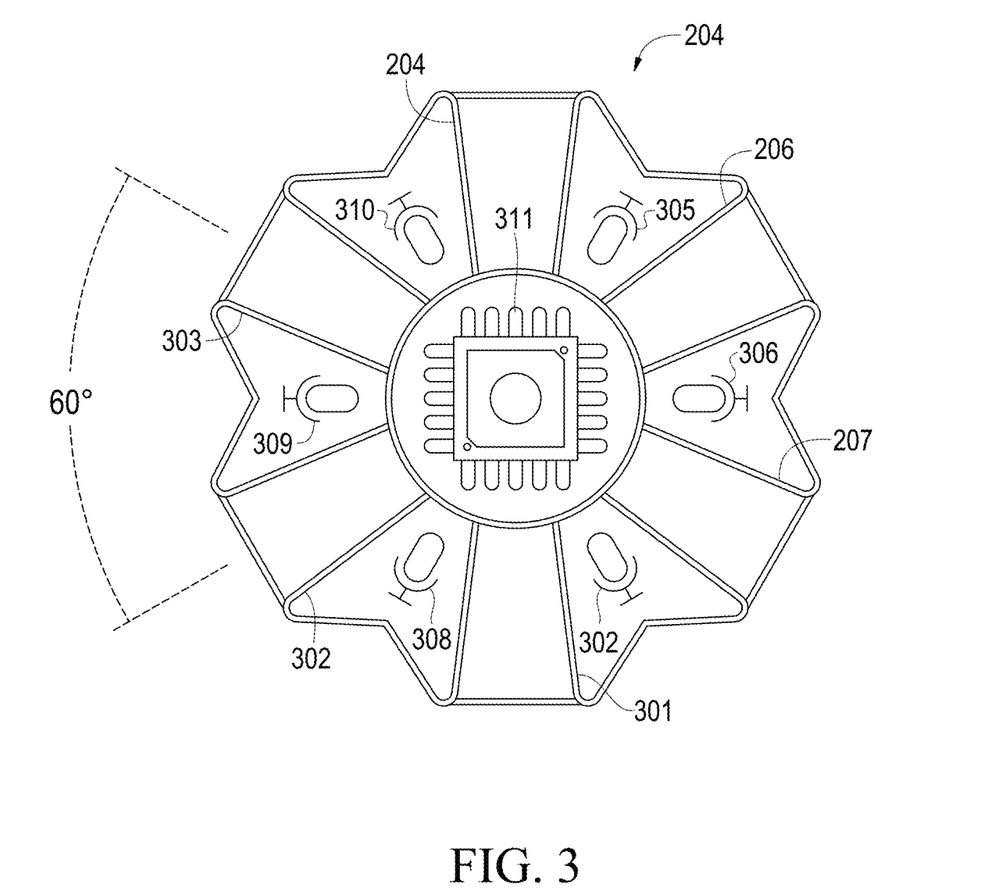
FIG. 3 is a cross-sectional view of a head of the detector such as is shown in FIG. 2.

FIG. 3 is a cross-sectional view of the head 204. In this regard, the head 204 comprises six (6) microphones 305-310. Each microphone has a cone 206, 207, and 301-304, respectively. The cones 206-207, and 301-304, respectively, aid the microphone in detecting sound waves 103 (FIG. 1).

In the embodiment shown in FIG. 3 there are six microphone 305-310. However, there may be more or fewer in other embodiments. With six microphones 305-306, the 360° acoustical field is covered by each of the microphones 305-310 acoustically covering 60°. That is microphone 305 covers the North, Northeast, and East zones, the microphone 306 covers the Northeast, East, and Southeast zone, the microphone 307 covers the Southeast, and South zones, the microphone 308 covers the South, Southwest, and West zone, the micro 309 covers the Southwest, South, and Northwest zone, and microphone 310 covers the Northwest and North zones.

Thus, regardless of where the sound originates, one or more of the microphones shall receive the sound waves 103. The head 204 further comprises a microcontroller. The microcontroller receives data from one or more of the microphones. Depending on which microphone(s) transmitted the data, the microcontroller comprises logic store in memory that performs acoustical analysis to determine, based upon which microphone originated the data, where the sound occurred.

Note that the microcontroller further comprises a Bluetooth transceiver. Thus, upon determination of where the sound originated, the logic transmits data indicative of the location to the handheld device 104.

Figure 4:
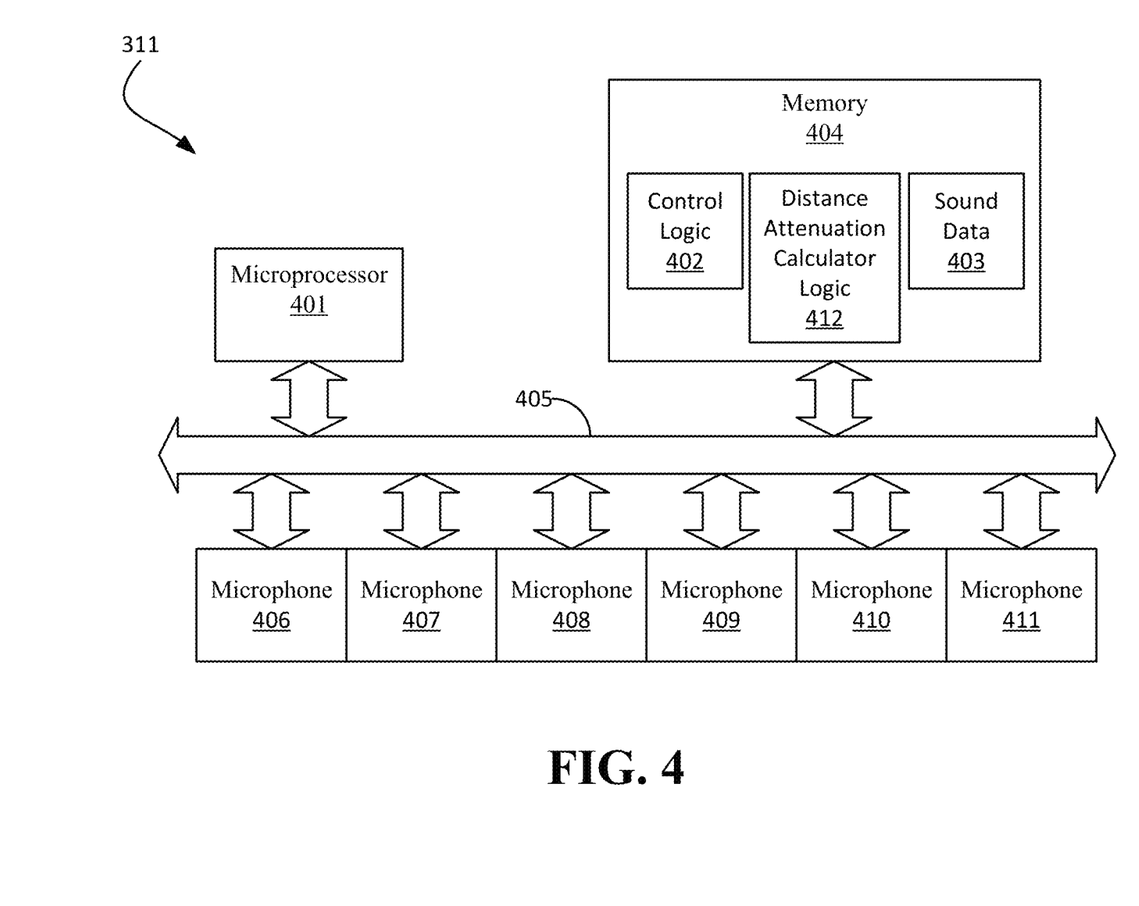
FIG. 4 is an exemplary microcontroller of the detector such as is shown in FIG. 2.

FIG. 4 depicts an exemplary embodiment of the microcontroller 311 depicted in FIG. 3. As shown by FIG. 4, the microcontroller 311 comprises control logic 402, distance attenuation calculator logic 412, and sound data 403 all stored in memory 300.

The control logic 402 generally controls the functionality of the microcontroller 311, as will be described in more detail hereafter. It should be noted that the control logic 402 can be implemented in software, hardware, firmware, or any combination thereof. In an exemplary embodiment illustrated in FIG. 4, the control logic 401 is implemented in software and stored in memory 404.

Note that the control logic 402, when implemented in software, can be stored, and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The distance attenuation calculator logic 412 generally controls determining a distance from the detector 101 of a sound. at least one bus. It should be noted that the distance attenuation calculator logic 412 can be implemented in software, hardware, firmware, or any combination thereof. In an exemplary embodiment illustrated in FIG. 4, the distance attenuation calculator logic 412 is implemented in software and stored in memory 404.

Note that the distance attenuation calculator logic 412, when implemented in software, can be stored, and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the microcontroller 312 depicted by FIG. 4 comprises at least one conventional processing element 401, such as a digital signal processor (DSP) or a central processing unit (CPU), that communicates to and drives the other elements within the microcontroller 312 via a local interface 405, which can include at least one bus. Further, the processing element 401 is configured to execute instructions of software, such as the control logic 402 and the distance attenuation calculator logic 412.

Figure 5:
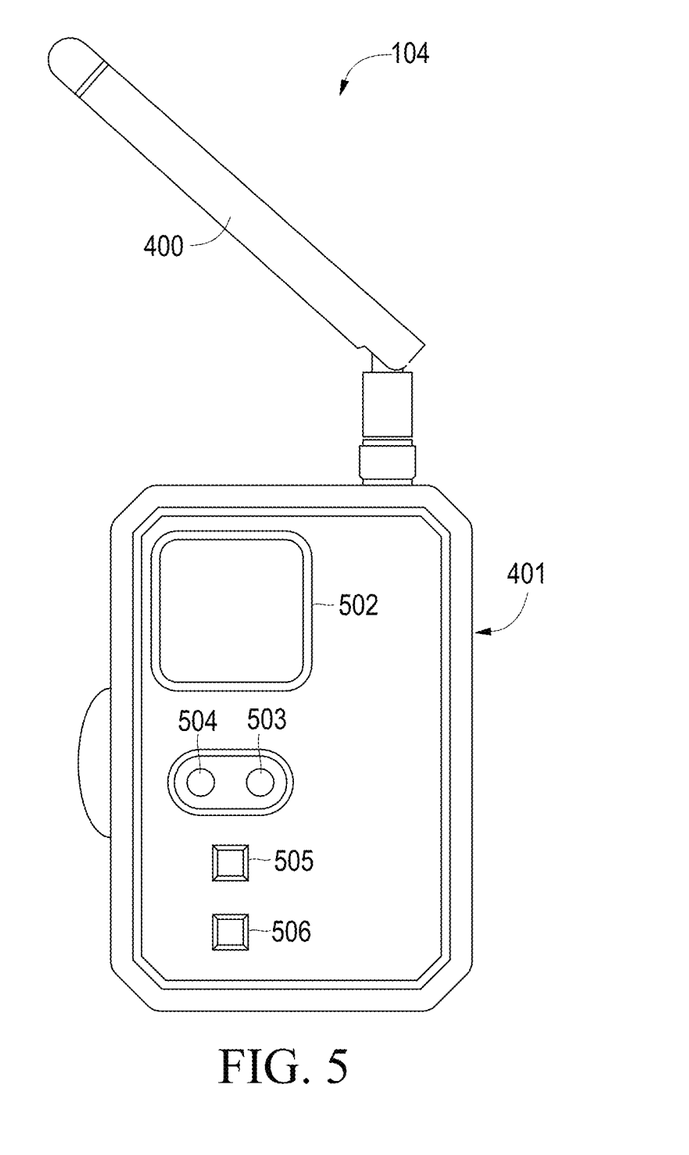
FIG. 5 is an exemplary handheld device such as is shown in FIG. 1.

FIG. 5 is a handheld device 104 in accordance with an embodiment of the present disclosure. The handheld device 104 comprises an antenna 500 for receiving data from the detector (FIG. 2).

The handheld device 104 comprises a microcontroller (not shown). The microcontroller comprises control logic and data stored in memory (not shown). Further, the microcontroller comprises a Bluetooth transceiver. The handheld device 104 allows for 1000 feet range fast wireless transmission. In one embodiment, the signal travels at 2.4 Gigahertz radio frequency signal allowing for fast data transfer between the handheld device 104 and the detector 101.

The handheld device 104 comprises a light 504 for indicating that the handheld 104 is on. That is, when the handheld device 104 is on, the light 504 may turn green. It may turn other colors in other embodiments. Further, the handheld device 104 comprises a light 503 for indicating battery level. That is, if the battery of the handheld device 104 is low, the light 503 activates. In one embodiment, it turns red.

The handheld device 104 comprises a pushbutton 505. Pushbutton 505 is selected to retrieve data. The handheld device 104 further comprises pushbutton 506 that when selected, resets the device.

Figure 6:
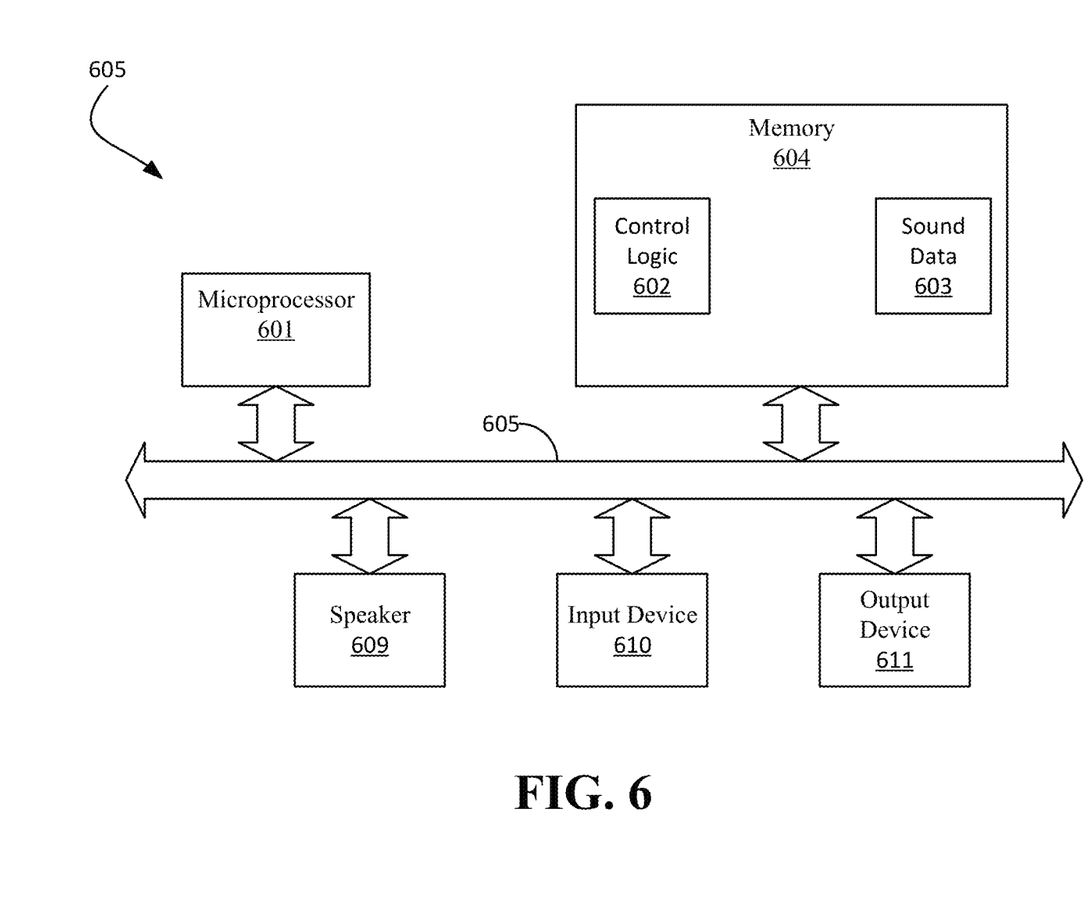
FIG. 6 is an exemplary microcontroller of the handheld device such as is shown in FIG. 5.

FIG. 6 depicts an exemplary embodiment of a microcontroller 605 of a handheld device 104 depicted in FIG. 4. As shown by FIG. 6, the microcontroller 605 comprises control logic 502 and sound data 603 all stored in memory 600.

The control logic 602 generally controls the functionality of handheld device 104, as will be described in more detail hereafter. It should be noted that the control logic 602 can be implemented in software, hardware, firmware, or any combination thereof. In an exemplary embodiment illustrated in FIG. 6, the control logic 602 is implemented in software and stored in memory 604.

Note that the control logic 602, when implemented in software, can be stored, and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the microcontroller 605 depicted by FIG. 6 comprises at least one conventional processing element 601, such as a digital signal processor (DSP) or a central processing unit (CPU), that communicates to and drives the other elements within the handheld device 104 via a local interface 605, which can include at least one bus. Further, the processor 601 is configured to execute instructions of software, such as the control logic 602.

The microcontroller 605 further has an input device 610. The input device 610 can be in the for of pushbuttons, for example button 505 for collecting data.

The microcontroller 605 has output device 612. The output device 605 may be in the for of flashing light-emitting-diodes (LED) on the handheld device 104. Another output device may be a speaker 609. The speaker may be able to repeat the sounds heard in the field and allow for better location of game.

During operations, a hunter 105 (FIG. 1) sets up the detector 204 (FIG. 2) in an area where the hunter 105 suspects there may be game. Note that the hunter 105 can move the detector 204 up and/or down or laterally depending upon the hunter's needs. The hunter 105 stands quietly in the bush or otherwise to avoid startling the game. Note that the handheld 204 has an activation footage of 1000 feet, so as long has the hunter 105 does not go outside the 1000 feet he can still transmit and receive signals from the detector 204.

Once the hunter 105 activates the detector 204 by pressing the pushbutton 505, the detector begins collecting data. Note that in one embodiment the detector 204 inherently knows direction via an internal compass. Thus, when the hunter 105 hears a sound or sees a direction indicator on the GUI, he can walk toward the sound to get a better shot of the game.

Figure 7:
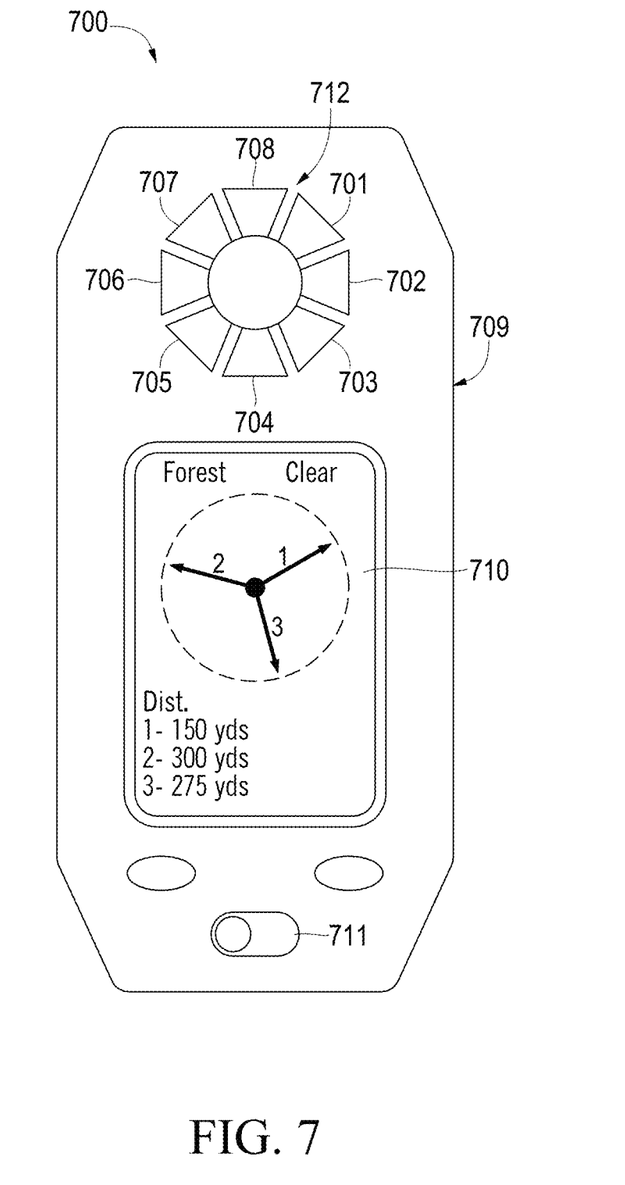
FIG. 7 is another embodiment of a system for enhancing location of game in a field

FIG. 7 is another embodiment of a system 700 for enhancing location of game in a field. The embodiment is a handheld unit comprising the components for detecting sound in a field.

The system 700 comprises a housing 709. The housing 709 may be made of plastic or some other type of durable material. The housing is an elongated octagon in shape.

On the front of the housing 709 at the top is an array 712 of microphones 701-708. Thus, the microphones' field of regard is 360°. That is, the system 700 can detect sound 360° about the system 711.

The system 700 comprises a graphical user interface (GUI). The GUI provides information to the hunter. For example, the clock-like arrows show the hunter the origination of the sound. It may also alert the hunter to how far the object that made the sound is located. For example, sound 1 was detected in the Northeast and is 150 yards.

Finally, the system 700 comprises an on/off switch 711. When a hunter desires to use the system to track prey, he may flip the system on using the switch 711.

Figure 8:
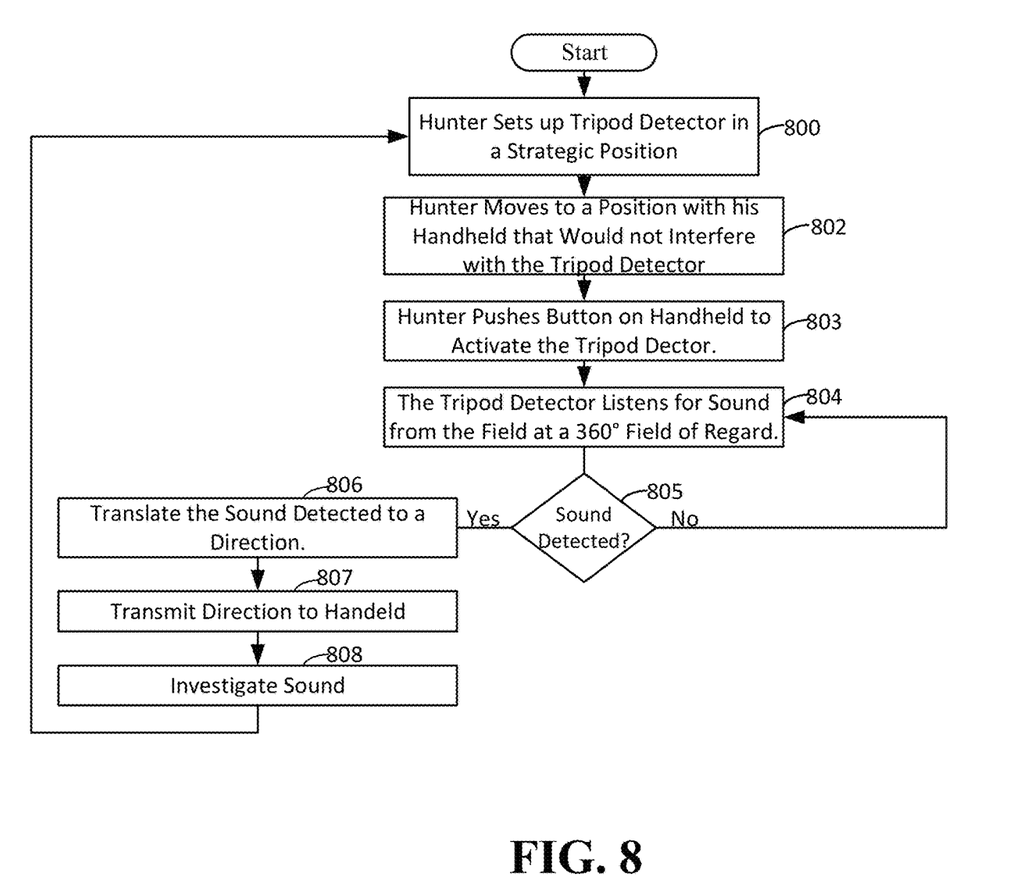
FIG. 8 is a flowchart depicting exemplary architecture and functionality of a system for enhancing location of game in a field.

FIG. 8 is a depiction of exemplary architecture and functionality of the system of the present disclosure.

Initially, a hunter sets up a tripod detector in a strategic position in step 800. For example, the hunter may know from experience where a group of deer congregate. Thus, the hunter may set up the tripod close to that area where the group of deer congregate.

In step 801, to avoid scaring off prey, the hunter may move to a position where the handheld may not interfere with the tripod detector.

In step 802, the hunter depresses the button on the handheld that starts receiving microphone data. The tripod detector listens for sound from the field of regard of 360°.

If sound is detected in step 804, the system translates the sound detected to a direction in step 805. The system transmits direction to the handheld device in step 806, and the hunter can then investigate the sound in step 807.

If no sound is detected in step 804, the hunter may continue to try to listen in the field of regard. However, the hunter may also move the tripod detector to another location and try again.

The invention claimed is:

1. A sound detector system, comprising:
   one or more microphones positioned within a field of regard of 360°, each of the one or more microphones embedded in a vortex of a respective microphone cone;
   a base for placing on the ground, the base coupled to a substantially cylindrical head and the microphone cones are mounted on an outside surface of a circumference of the substantially cylindrical head;
   a processor configured to translate a sound into data indicative of a direction and transmit the data indicative of direction;
   a handheld device configured to wirelessly receive the data indicative of the direction and display data identifying the direction to a user.

2. The sound detector system of claim 1, wherein the handheld device comprises a button for requesting data from the processor.

3. The sound detector system of claim 1, further comprising a light for indicating that the handheld detector is in an on position.

4. The sound detector system of claim 1, further comprising a button for resetting the one or more microphone.

5. The sound detector system of claim 1, wherein the processor is configured to execute distance attenuation to determine the distance of the sound from the one or more microphone.

* * * * *